J. NICHOLSON.
RETORT FOR MAKING OIL FROM COAL.
No. 712. Reissued May 3, 1859.
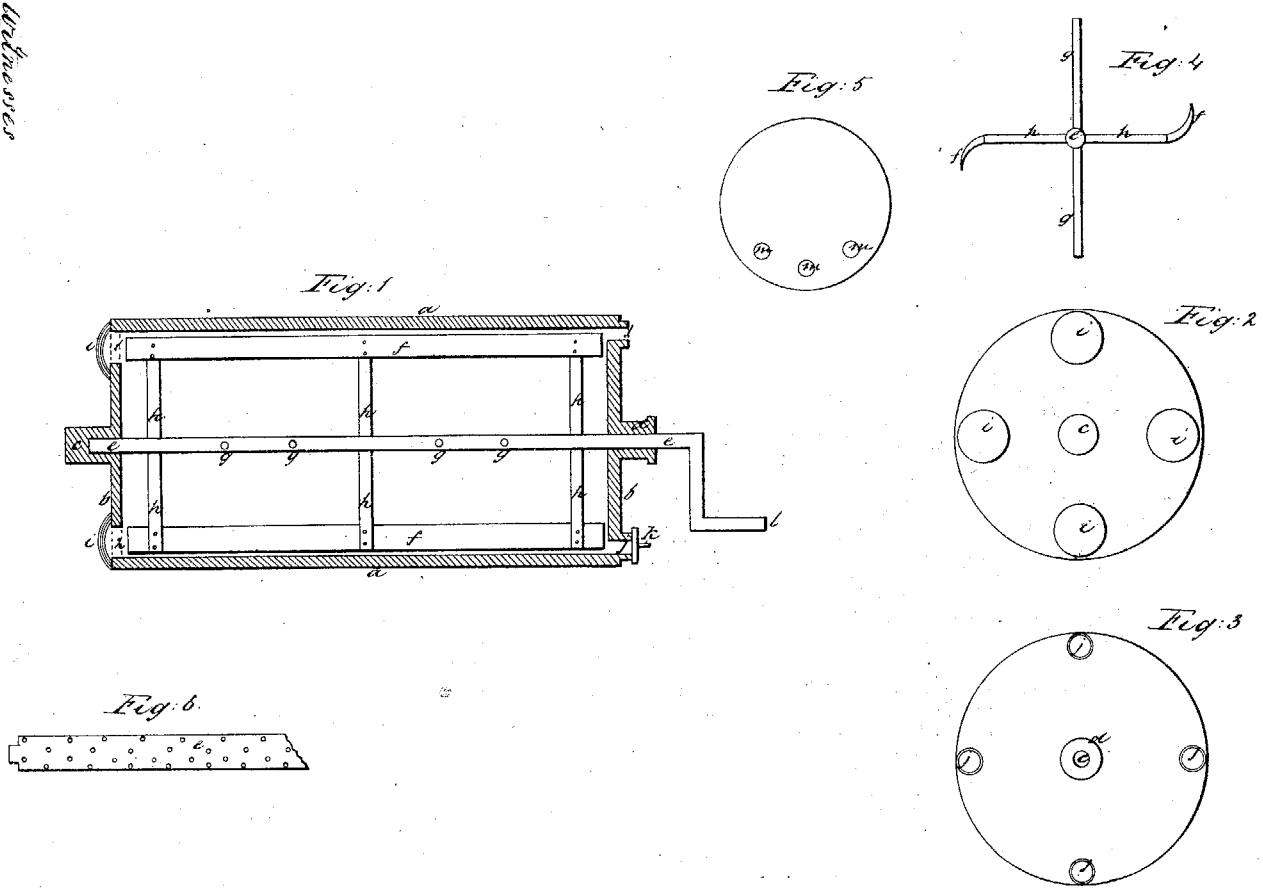
Witnesses
James J. Johnston
J. B. Johnston
Inventor
John Nicholson

UNITED STATES PATENT OFFICE.

JOHN NICHOLSON, OF ALLEGHENY, PENNSYLVANIA.

IMPROVEMENT IN RETORTS FOR DISTILLING OILS FROM COAL.

Specification forming part of Letters Patent No. 22,973, dated February 15, 1859; Reissue No. 712, dated May 3, 1859.

*To all whom it may concern:*

Be it known that I, JOHN NICHOLSON, of the city and county of Allegheny, in the State of Pennsylvania, have invented a new and useful Improvement in Retorts for Distilling Oil from Coal; and I do hereby declare that the following is a full, clear, and exact description thereof, reference being had to the accompanying drawings, and to the letters of reference marked thereon, similar letters referring to similar parts.

The nature of my invention consists in furnishing retorts for making oil from bituminous or other coal with a straight or curved blade or blades placed on arms or agitators radiating from a shaft, and also in an arrangement of the exit-pipes for the discharge of oleaginous vapor, and the arrangement of the discharge and supply openings, the whole being arranged in the manner and for the purpose hereinafter described.

To enable others skilled in the art to make and use my invention, I will proceed to describe its construction and operation.

In the accompanying drawings, Figure 1 is a cut or sectional view of the retort. Fig. 2 is the front end of the retort. Fig. 3 is the back end. Fig. 4 is a section of the shaft and agitators. Fig. 5 is an end view of a retort representing the end view of three shafts. Fig. 6 is a sectional view of a shaft representing the agitators arranged spirally around the shaft.

*a* is the cylinder of the retort. *b* are the ends. *c* and *d* are the trunnions for the retort, and the plumber-blocks or bearings for the shaft *e*, which shaft is armed with agitators furnished with straight or curved blades, which is plainly shown in Fig. 4 at *f* and *g*. *j* are the pipes for the passage of oleaginous vapor. All of these pipes are furnished with caps, *k*, with the exception of one. *i* are caps for closing the supply and discharge openings, which are marked 1 and 2 in Fig. 1.

The pipes for the discharge of oleaginous vapor, and openings for the supply of coal and the discharge of the refuse or coke, are arranged opposite or in a line with each other, being so arranged that when an exit-pipe is open at the top of the back end of the retort a supply and discharge opening will be at the lower side of the front end. The openings in trunnion *d* should be made to fit closely around the shaft *e*, so as to prevent the escape of the vapor or fumes. This may be readily accomplished by the use of a suitable stuffing-box and metallic packing.

In the drawings, *l* is the crank for driving the shaft *e*. *h* are the arms radiating from shaft *e*. *m*, in Fig. 5, are shafts.

The operation of my retort is as follows: Having the parts arranged as represented in Fig. 1, I remove the cap *i* and place in the retort the desired quantity of coal or other matter through the opening 2. The cap is replaced and secured. The heat is applied in the retort in usual manner. Power is applied to the crank *l* of shaft *e*, the revolving of which will agitate the mass within the retort, bringing all parts of it in contact with the heat, thereby causing a complete and perfect separation of the oleaginous vapor from the coal or other matter.

By the arrangement of the discharge and supply openings in connection with the trunnions and exit-openings *j*, different parts or sides of the retort can be changed and be brought in contact with the fire when any part is weakened by the action of heat.

I wish it to be clearly understood that I do not claim a revolving or oscillating retort; nor do I claim an Archimedean screw revolving inside of a retort; nor do I claim in general the use of a shaft armed with agitators within a retort; but What I do claim as my invention, and desire to secure by Letters Patent of the United States, is—

1. The use of a straight or curved blade or blades placed on the agitators or arms *h* of shaft *e*, for the purpose of agitating, lifting, mixing, and bringing all parts of the mass within the retort in contact with the heat, as herein described and set forth.

2. The arrangement near the outer edge of one end of a retort of four or more supply and discharge openings, and on the other end near the outer edge of four or more exit-pipes placed on a line with and opposite to the supply and discharge openings, as herein described.

JOHN NICHOLSON.

Witnesses:

JAS. B. JOHNSTON,
R. H. KNOX.